United States Patent [19]
Arora

[11] 3,732,698
[45] May 15, 1973

[54] METHOD FOR STABILIZING SOILS AND ABATING ACTIVE SLIDES

[75] Inventor: Harpal S. Arora, Daly City, Calif.

[73] Assignee: Edward D. Graf, Daly City, Calif.

[22] Filed: May 5, 1971

[21] Appl. No.: 140,624

[52] U.S. Cl. .................................................61/36 R
[51] Int. Cl.........E01c 11/24, E02d 3/12, E02d 3/14
[58] Field of Search .................................61/36 R, 35

[56] References Cited

UNITED STATES PATENTS

| | | | |
|---|---|---|---|
| 3,503,215 | 3/1970 | Graf et al. | 61/35 |
| 3,490,241 | 1/1970 | Kuhn | 61/36 R |
| 2,200,710 | 5/1940 | Bent et al. | 61/36 R |
| 3,288,040 | 11/1966 | Burrows | 61/36 R X |
| 3,075,851 | 1/1963 | Hemwall | 61/36 R |
| 2,393,173 | 1/1946 | Larsen | 61/36 R X |
| 2,176,266 | 10/1939 | Malmberg | 61/36 R |
| 2,995,457 | 8/1961 | Lyons et al. | 62/36 R X |

*Primary Examiner*—Stephen J. Novosad
*Attorney*—Townsend and Townsend

[57] ABSTRACT

Stabilization of soil masses and abatement of active slides are accomplished by applying an aqueous solution, slurry or powder, of a chemical agent to the soil. The chemical agent is selected from ammonium, and mono, di, and trivalent metal salts of carboxylic acids, usually dicarboxylic acids of from two to six carbon atoms; ammonium and mono, di, and trivalent metal fluorides and polyfluorides; ammonium and mono, di, and trivalent metal fluoborates, fluosilicates and fluorophosphates; ammonium and alkali metal salts of phosphoric and polyphosphoric acids; sulfate salts of mono, di, and trivalent metals; cupric chloride; stannic (IV) chloride; and borate salts of metals.

14 Claims, No Drawings

METHOD FOR STABILIZING SOILS AND ABATING ACTIVE SLIDES

This invention relates to the treatment of soils by the application to the soil of a chemical agent containing soil stabilizing groups, and more particularly to new chemical agents for effecting soil stabilization and slide abatement.

In U. S. Pat. No. 3,490,241, a method for stabilizing soils is described wherein an organic or inorganic salt is formulated in an aqueous solution and thereafter applied to a soil to be treated. The application and distribution of the solution is accomplished by physical diffusion of the ions through the soil so that the soil is stabilized at locations spaced from as well as at the point of application. Suitable stabilization agents included aqueous solutions of aluminum chloride, aluminum nitrate, ferric chloride, low molecular weight amine-acid salts, calcium chloride, calcium orthophosphate, and ammonium phosphate.

In U. S. Pat. No. 3,503,215 a method for treating an active soil slide is described wherein the soil stabilizing agents disclosed in U. S. Pat. No. 3,490,241 are directly contacted with at least a portion of the slip surface of an active slide to prevent further sliding. It was found that by contacting the slip surface with stabilizing agents the sliding could be abated.

Additional stabilization agents have now been discovered for use in the above-described techniques for stabilization of soils, reduction or elimination of expansiveness or swelling, and abatement of active soil slides. These agents are characterized in that they are water soluble and ionizable. They are further characterized in that they contain cations and anions which can interact with the soil colloidal materials to effect a stabilization thereof. In many cases, these agents are far more effective in stabilizing soils than those agents heretofore disclosed in the above-described prior art.

That the agents for use in this invention were effective in soil stabilization was unexpected in view of the unpredictability associated with said chemistry. It was further found that many of these same agents exhibited even greater utility in achieving soil strengthening than the previously disclosed agents of the prior art, even though they contained the same cations.

In particular, the soil stabilizing agents for use in this invention are selected from one of the following classes of compounds:

1. ammonium and mono, di, and trivalent metal salts of carboxylic acids, usually dicarboxylic acids of from two to six carbon atoms. Exemplary salts include ammonium citrate, potassium citrate, ammonium oxalate, potassium oxalate, sodium citrate, sodium oxalate, ammonium tartrate, ferric oxalate, potassium tartrate, ferric ammonium citrate, sodium tartrate, ammonium benzoate, potassium formate, barium acetate, aluminum lactate, magnesium formate, potassium succinate, and the like;
2. ammonium and mono, di, and trivalent metal fluorides and polyfluorides. Exemplary salts are potassium fluoride, ammonium fluoride, ammonium bifluoride, aluminum fluoride, sodium fluoride, and the like;
3. ammonium and mono, di, and trivalent metal fluoborates, fluosilicates and fluorophosphates. Exemplary salts are ammonium fluosilicate, ammonium fluoborate, magnesium fluosilicate, zinc fluosilicate, ammonium hexafluorophosphate and potassium hexafluorophosphate, and the like;
4. ammonium and alkali metal salts of phosphoric and polyphosphoric acids. Exemplary salts are mono and di-basic ammonium phosphate, mono and di-basic potassium phosphate, mono and di-basic sodium phosphate, potassium tripolyphosphate, sodium ammonium phosphate, sodium pyrophosphate, and the like;
5. sulfate salts of mono, di, and trivalent metals. Exemplary salts are aluminum ammonium sulfate, aluminum potassium sulfate, aluminum sulfate, ferric sulfate, ferric aluminum sulfate, chromium potassium sulfate, ammonium ceric sulfate, and cupric sulfate;
6. cupric chloride;
7. stannic (IV) chloride;
8. borate salts of metals. Exemplary compounds are cadmium borate and potassium borate.

Usually the salts will be water soluble at ambient temperatures (about 20° C.) to at least about 0.5 or more weight percent, more usually about 1 weight percent. The alkali metal phosphates, polyphosphates and salts of dicarboxylic acids of from about two to six carbon atoms, e.g. oxalates, citrates and tartrates, are most frequently found to be effective in the present technique. Also, the alkali metal fluoborates and fluosilicates very frequently can be used to advantage.

While all of the above-described agents are effective in stabilizing at least some soils, some are more effective than others. The effectiveness of each agent is dependent upon the particular soil being treated. Though not wishing to be bound by the following theory, it is believed that both the cations and anions of the soil stabilizing agents of this invention are involved in exchange with the soil and/or bonding as by hydrogen bonding. It has been observed that various soils adsorb anions that can be subsequently exchanged with other anions to thus exhibit an anion exchange capacity. Other soils are capable of direct anion exchange. Thus, when the agents of this invention are dissolved, both the anions and cations in solution are free to interact and exchange with cations and anions naturally occurring on the soil colloids.

To insure maximum ion exchange, and thus maximum soil stabilization, the selected salts should preferably contain ions which do not naturally occur in the soil being treated at least in soluble forms. For example, it is known that calcareous soils contain carbonates and bicarbonates. Acidic soils, on the other hand, contain large amounts of soluble phosphate and sulfate ions. It has also been observed that chlorides, nitrates, and sulfates are to be found in soils of any pH. Thus, if a phosphate salt such as ammonium phosphate were applied to an acidic soil, which already has an adequate amount of soluble phosphates, relatively little anion exchange can occur. However, when that same agent is added to a calcareous soil, which usually don't have soluble phosphates present, a much greater increase in soil stabilization is observed due to the increased anion exchange possibilities.

It appears that the anions of the carboxylic acid salts not only interact and exchange with anions already present in the soil, but tend to increase the solubility of naturally occurring phosphates and other anions like silicates, in the soil such as the aluminum and iron phosphates. The more phosphate anions in solution, the more there are available for exchange with other anions in the soil.

It is to be appreciated that the amounts of the salts to be employed as well as the methods of application of the agents of this invention are in accordance with those set forth in the above-mentioned patents. The agent can be applied as a solution over the ground to be treated or in the case of an active slide, applied directly to a slip plane of the slide as by pouring solution into tension cracks and fissures.

Surface application is contemplated as well as subsurface application wherein the chemical can be added to holes bored in the ground. In the case of active slides, these chemicals are applied as close to the slip plane as possible and are also added in excess near other observed weak planes so that new slip planes do not develop.

A sufficient amount of the agent will be used to effectuate an increase in soil strength. Generally, it will be desirable to saturate or satisfy at least a substantial portion of the ion exchange and adsorption capacity of the soil being treated. As pointed out in copending application Ser. No. 75,749, filed Sept. 25, 1970, the concentration of the stabilizing chemicals is not a critical factor for most of the soils. Small amounts of about 1 percent by weight and less have been found to be effective in soil stabilization. Dry powder or concentrated slurries of chemicals when applied at strategic points have been observed to distribute themselves by mass flow or diffusion.

The invention is primarily adapted for use with clay-type soils or those which become clay-like in physical or chemical properties when moist. In some cases it is also possible to stabilize fine silts as they also show cation and anion exchange capacities. It will be appreciated that clay as a generic term covers many different types of materials such as illitic clays, vermiculitic clays and montmorillonitic clays. Further, no two clay containing soils are exactly alike in their chemical makeup. As their compositions differ, so will the types of cations and anions contained therein. For a particular soil in a given region, one salt may be more suitable than another. The determination of which salt will afford the greatest soil stabilization can be established by routine laboratory procedures.

It may well be that no single ionizable salt is best suited. The admixture of two or more salts may thus be indicated for a given soil. To this end, it is preferred to initially take small samples of the soil to be treated and apply to them a plurality of the agents of the type described herein. In this way, the optimum chemical or mixture of chemicals can be used to stabilize the soil. By selection and combination of several salts, a standard formulation can be provided for effective treatment of a variety of soil types which may be encountered in a given geographical region or soil series.

The following examples are presented to illustrate the invention. Four soils were studied. Various agents in accordance with this invention were added to these soils, and the strength of the soils measured after 1, 7, and 28 days. Of the four soils, three were slightly basic, and one slightly acidic. In each run, a sufficient amount of a 2 percent aqueous solution of a soil stabilizing agent was added to approximately 150 grams of soil to bring the soil consistency to near its liquid limit.

EXAMPLE 1

Samples of Atherton soil, an expansive fat clay soil from Atherton, San Mateo County, Cal., containing 24 percent calcium carbonate were treated with an aqueous solution or slurry containing the various stabilizing agents of this invention, and the strength of the soil samples determined after 1, 7, and 28 days using a vane shear device calibrated in inch ounces. In this and all other examples, the control run comprised distilled water. The results are reported below.

TABLE I

ATHERTON SOIL

| AGENT | Observed soil strength after | | |
|---|---|---|---|
| | 1 Day | 7 Days | 28 Days |
| 1. Ammonium Fluoborate | 30 | 32 | 40 |
| 2. Potassium Phosphate Dibasic | 36 | 34 | 56 |
| 3. Potassium Citrate | 42 | 44 | 68 |
| 4. Aluminum Potassium Sulfate | 38 | 44 | 40 |
| 5. Ferric Sulfate | 25 | 26 | 26 |
| 6. Magnesium Fluosilicate | 28 | 32 | 40 |
| 7. Sodium Ammonium Phosphate | 48 | 50 | 52 |
| 8. Sodium Citrate | 36 | 44 | 44 |
| 9. Sodium Phosphate Monobasic | 38 | 52 | 50 |
| 10. Cupric Chloride | 36 | 40 | 50 |
| 0 Control | 17 | 18 | 18 |
| Aluminum Chloride | 16 | 22 | 25 |
| Ferric Chloride | 19 | 20 | 25 |
| Aluminum Nitrate | 22 | 25 | 24 |

From the above, it can readily be seen that, in general, the phosphate and carboxylic acid salts were the most effective in stabilizing the Atherton soil. This was not unexpected since Atherton soil is an alkaline soil, low in phosphate ion concentration. It is also to be noted that the ammonium fluoborate, aluminum potassium sulfate, and magnesium fluosilicate were likewise effective.

To illustrate that both anion and cation exchange have occurred, attention is directed to the reported results for aluminum potassium sulfate, ferric sulfate, aluminum chloride and ferric chloride. The aluminum potassium sulfate was more than 60 percent effective than the aluminum chloride, even after 28 days. The ferric sulfate was about 20 percent more effective than the ferric chloride after 1 day.

EXAMPLE 2

In a manner similar to Example 1, an expansive fat clay soil from Palmdale, Los Angeles County, Cal., was treated with various soil stabilizing agents; the results are reported below.

TABLE II

PALMDALE SOIL

| AGENT | Observed soil strength after | | |
|---|---|---|---|
| | 1 day | 7 days | 28 days |
| 1. Ammonium Chloride | 3 | 4 | 5 |
| 2. Ammonium Fluosilicate | 24 | 36 | 48 |
| 3. Ammonium Fluoborate | 12 | 12 | 17 |
| 4. Ammonium Oxalate | 30 | 30 | 36 |
| 5. Potassium Chloride | 5.5 | 6.5 | 8.5 |
| 6. Potassium Citrate | 13 | 18 | 19 |
| 7. Potassium Fluoride | 24 | 32 | 26 |
| 8. Sodium Chloride | 5 | 7 | 8 |
| 9. Sodium Tripolyphosphate | 64 | 68 | 60 |
| 10. Sodium Ammonium Phosphate | 36 | 52 | 60 |
| 11. Sodium Citrate | 19 | 24 | 24 |
| 12. Sodium Phosphate Monobasic | 16 | 36 | 32 |
| 0 Control | 6 | 7 | 9 |
| Ferric Chloride | 4 | 6 | 8 |
| Aluminum Chloride | 3 | 4.5 | 7 |

Again, the phosphate and carboxylic acid salts were most effective for soil stabilization. Also effective was ammonium fluosilicate and potassium fluoride. Ammonium chloride imparted a soil strength of only 4 inch ounces after 7 days, whereas the other ammonium salts were three to nine times more effective. Similarly, potassium chloride was particularly ineffective, especially in comparison with the citrate and fluoride salts of potassium.

EXAMPLE 3

In a manner similar to Examples 1 and 2, soil samples from Vancouver, Washington were obtained, stabilizing agents of this invention added thereto, and the results reported below.

TABLE III

VANCOUVER, WASHINGTON QUARANTINE STATION SOIL L

| AGENT | Observed soil strength after | | |
|---|---|---|---|
| | 1 Day | 7 Days | 28 Days |
| 1. Ammonium Chloride | 5 | 8 | 8 |
| 2. Ammonium Citrate Dibasic | 28 | 48 | 32 |
| 3. Ammonium Fluosilicate | 12 | 12 | 6 |
| 4. Ammonium Fluoborate | 6 | 6 | 14 |
| 5. Ammonium Oxalate | 24 | 24 | 24 |
| 6. Potassium Chloride | 2.5 | 2.5 | 5 |
| 7. Potassium Phosphate Dibasic | 8 | 8 | 10 |
| 8. Potassium Citrate | 12 | 18 | 18 |
| 9. Potassium Fluoride | 4 | 4 | 4 |
| 10. Ferric Oxalate | 64 | 80 | 88 |
| 11. Magnesium Fluosilicate | 40 | 48 | 48 |
| 12. Sodium Tripolyphosphate | 40 | 56 | 68 |
| 13. Sodium Ammonium Phosphate | 32 | 36 | 48 |
| 14. Sodium Citrate | 10 | 16 | 20 |
| 15. Zinc Fluosilicate | 6 | 6 | 6 |
| O Control | 15 | 15 | 15 |
| Ferric Chloride | 2 | 2 | 2 |

Again, the dicarboxylic acid and phosphate salts were generally effective. The soil being slightly acidic, it was not surprising to find that some agents, effective with basic soils, were relatively ineffective herein.

EXAMPLE 4

Following the procedures of the above examples, a Danville soil was obtained and various samples of the soil mixed with various agents according to this invention, the results recorded below. The Danville soil is an expansive clay soil from Danville, Cal., and has a calcium carbonate content of approximately 18 percent.

TABLE IV

DANVILLE SOIL

| AGENT | observed soil strength after | | |
|---|---|---|---|
| | 1 Day | 7 Days | 28 Days |
| 1. Ammonium Fluosilicate | 9 | 7 | 12 |
| 2. Ammonium Oxalate | 19 | 28 | 28 |
| 3. Potassium Phosphate Dibasic | 16 | 21 | 21 |
| 4. Potassium Fluoride | 22 | 28 | 29 |
| 5. Potassium Tartrate | 14 | 17 | 20 |
| 6. Potassium Oxalate | 24 | 28 | 32 |
| 7. Potassium Tripolyphosphate | 18 | 24 | 24 |
| 8. Tetrapotassium Pyrophosphate | 21 | 28 | 28 |
| 9. Sodium Tripolyphosphate | 24 | 28 | 30 |
| 10. Sodium Ammonium Phosphate | 23 | 28 | 18 |
| 11. Sodium Citrate | 11 | 13 | 19 |
| 12. Zinc Fluosilicate | 14 | 19 | 20 |
| O Control | 5 | 7 | 11 |

As in the previous examples, the dicarboxylic acid salts were uniformly effective in stabilizing the soil, as were the phosphates. Also reasonably effective were potassium fluoride, and zinc fluosilicate.

From the above experiments it is apparent that no one single agent is best suited for any particular soil. In some cases, a fluoride salt such as potassium fluoride may be particularly effective such as with a Danville type soil. In other cases it may be particularly ineffective such as with a soil from Vancouver, Washington. Thus, the need for testing samples of a given soil which may include a chemical analysis of its pore water before a treatment program is begun is evident. It is also apparent that certain phosphate salts and most of the dicarboxylic acid salts are effective for almost all the types of soil tested.

What is claimed is:

1. In the method for treating soil to stabilize it, to reduce or eliminate expansiveness, or to abate active sliding by distributing an effective amount of water soluble ionizable chemical to the soil including the slip plane where active sliding is to be abated, said chemical providing soil strengthening ions when ionized in the soil of the type that stabilizes the lattice of the soil particles by mechanisms including ion exchange with exchangeable ions naturally occurring in the soil particle lattice, the ions provided by said chemical being in an amount sufficient to stabilize the soil being treated, the distribution of said ions including diffusion through the soil by ionic migration to stabilize the area of said migration by ion exchange, the improvement wherein said chemical composition includes at least one member selected from the group consisting of ammonium and mono, di and trivalent metal salts of carboxylic acids; ammonium and mono, di, and trivalent metal fluorides and polyfluorides; ammonium and mono, di, and trivalent metal fluoborates, fluosilicates and fluorophates; ammonium and alkali metal salts of polyphosphoric acids; alkali metal salts of phosphoric acid; sulfate salts of mono, di, and trivalent metals; cupric chloride; stannic (IV) chloride; and borate salts of metals.

2. The improved method according to claim 1 wherein said chemical composition includes a metal salt of a carboxylic acid which is an oxalate, citrate, tartrate, benzoate, formate, acetate, lactate or succinate.

3. The improved method according to claim 1 wherein said chemical composition includes a metal fluoride, metal fluoborate or metal fluosilicate.

4. The improved method according to claim 1 wherein said chemical composition includes an alkali metal phosphate or polyphosphate.

5. The improved method according to claim 4 wherein said chemical composition includes an alkali metal polyphosphate.

6. The improved method according to claim 5 wherein said alkali metal polyphosphate is potassium tripolyphosphate.

7. The improved method according to claim 4 wherein said chemical composition includes tetrapotassium pyrophosphate.

8. The improved method according to claim 1 wherein at least about one weight percent of said chemical composition is applied to the soil.

9. The improved method according to claim 1 wherein said chemical composition includes a metal sulfate salt.

10. The improved method according to claim 1 wherein said chemical composition includes cupric chloride.

11. The improved method according to claim 1 wherein said chemical composition includes stannic (IV) chloride.

12. The improved method according to claim 1 wherein said chemical composition includes metal borate.

13. In the method for treating an active soil slide by treating at least a portion of the established slip plane or slip surface with a sufficient amount of a chemical stabilizing agent to halt sliding along said slip plane or surface, the improvement wherein said chemical stabilizing agent is selected from the group consisting of ammonium and mono, di, and trivalent metal salts of carboxylic acids; ammonium and mono, di, and trivalent metal fluorides and polyfluorides; ammonium and mono, di, and trivalent metal fluoborates, fluosilicates and fluorophosphates; ammonium and alkali metal salts of polyphosphoric acids; alkali metals salts of phosphoric acid; sulfate salts of mono, di, and trivalent metals; cupric chloride; stannic (IV) chloride; and borate salts of metals.

14. The improved method in accordance with claim 13 wherein the soil being treated is an expansive, fat clay soil.

* * * * *